(12) United States Patent
Panikkar et al.

(10) Patent No.: US 11,809,589 B2
(45) Date of Patent: Nov. 7, 2023

(54) SECURE DATA STRUCTURE FOR DATABASE SYSTEM

(71) Applicant: Dell Products L.P., Round Rock, TX (US)

(72) Inventors: Shibi Panikkar, Bangalore (IN); Pratheek Veluswamy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 198 days.

(21) Appl. No.: 17/154,271

(22) Filed: Jan. 21, 2021

(65) Prior Publication Data

US 2022/0229930 A1  Jul. 21, 2022

(51) Int. Cl.
*G06F 21/62* (2013.01)
*G06F 16/21* (2019.01)
*G06F 21/60* (2013.01)

(52) U.S. Cl.
CPC ........ *G06F 21/6227* (2013.01); *G06F 16/211* (2019.01); *G06F 21/602* (2013.01)

(58) Field of Classification Search
CPC .. G06F 21/6227; G06F 16/211; G06F 21/602; G06F 21/6218
See application file for complete search history.

(56) References Cited

U.S. PATENT DOCUMENTS

| 8,266,101 | B1* | 9/2012 | Shuai | G06F 16/275 707/610 |
|---|---|---|---|---|
| 9,703,855 | B1* | 7/2017 | Smalley | G06F 16/93 |
| 11,487,777 | B1* | 11/2022 | Bose | G06F 16/214 |
| 2008/0147595 | A1* | 6/2008 | Rjaibi | G06F 21/6227 |
| 2010/0131518 | A1* | 5/2010 | Elteto | G06F 21/105 707/752 |
| 2011/0119288 | A1* | 5/2011 | Sinha | G06F 16/217 707/769 |
| 2011/0191626 | A1* | 8/2011 | Sqalli | G06F 11/00 707/610 |
| 2013/0036458 | A1* | 2/2013 | Liberman | G06F 21/32 726/5 |
| 2013/0246813 | A1* | 9/2013 | Mori | H04L 9/008 713/193 |
| 2018/0248848 | A1* | 8/2018 | Wu | G06F 21/6227 |
| 2022/0075877 | A1* | 3/2022 | Helms | G06F 21/602 |

OTHER PUBLICATIONS

W3RESOURCE, "SQL Injection Tutorial," https://www.w3resource.com/sql/sql-injection/sql-injection.php#h_one, Feb. 26, 2020, 19 pages.

* cited by examiner

*Primary Examiner* — Meng Li
(74) *Attorney, Agent, or Firm* — Ryan, Mason & Lewis, LLP

(57) ABSTRACT

Data protection techniques for data structures in an information processing system are provided. For example, a method comprises the following steps. A request is received to create a data structure with a given data structure name and one or more given parameter names. A pair of data structures is generated in response to the request. Each of the pair of data structures is assigned a different randomly-generated data structure name derived from the given data structure name in the request, and the one or more given parameter names are assigned different one or more randomly-generated parameter names in each of the pair of data structures.

20 Claims, 6 Drawing Sheets

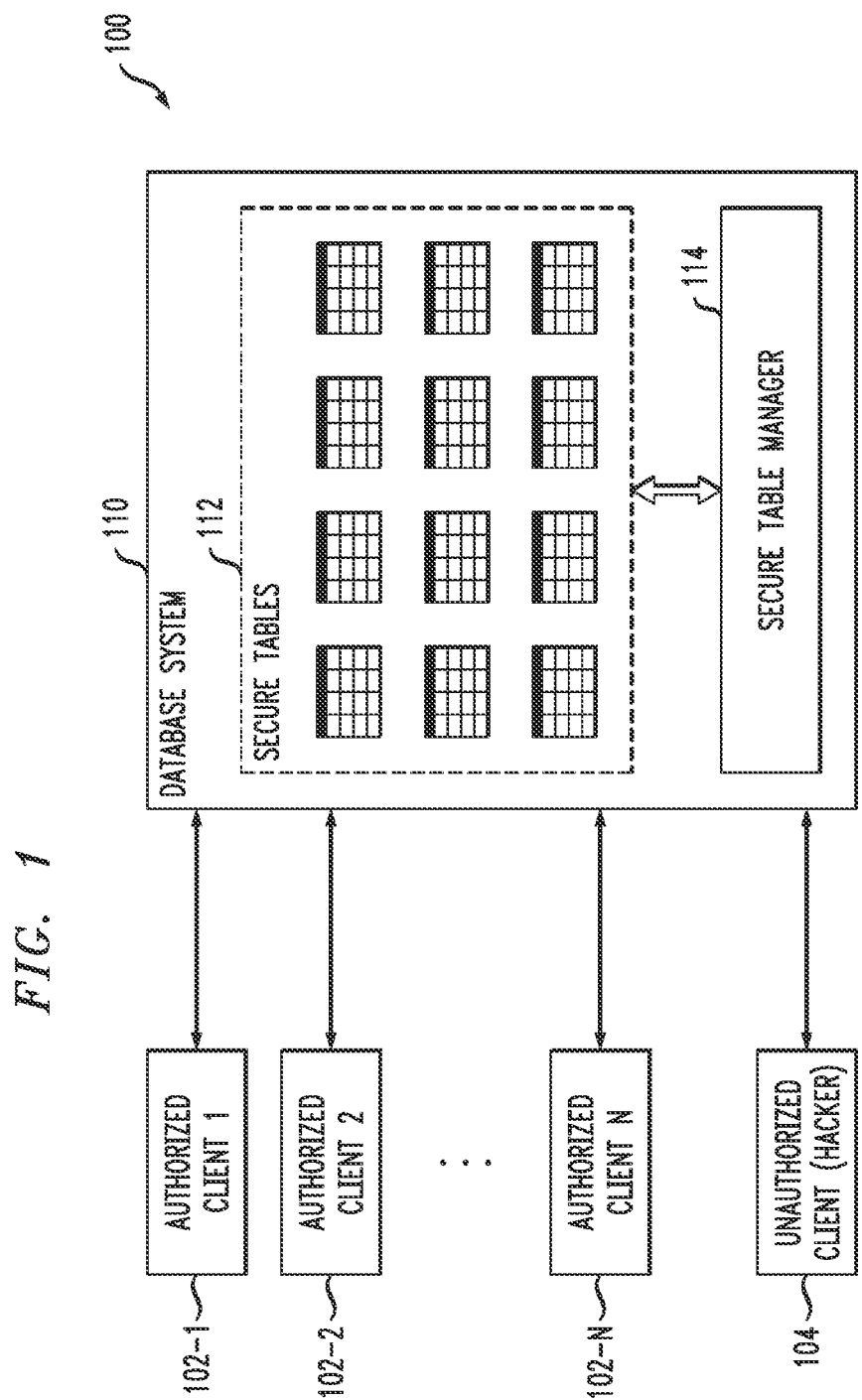

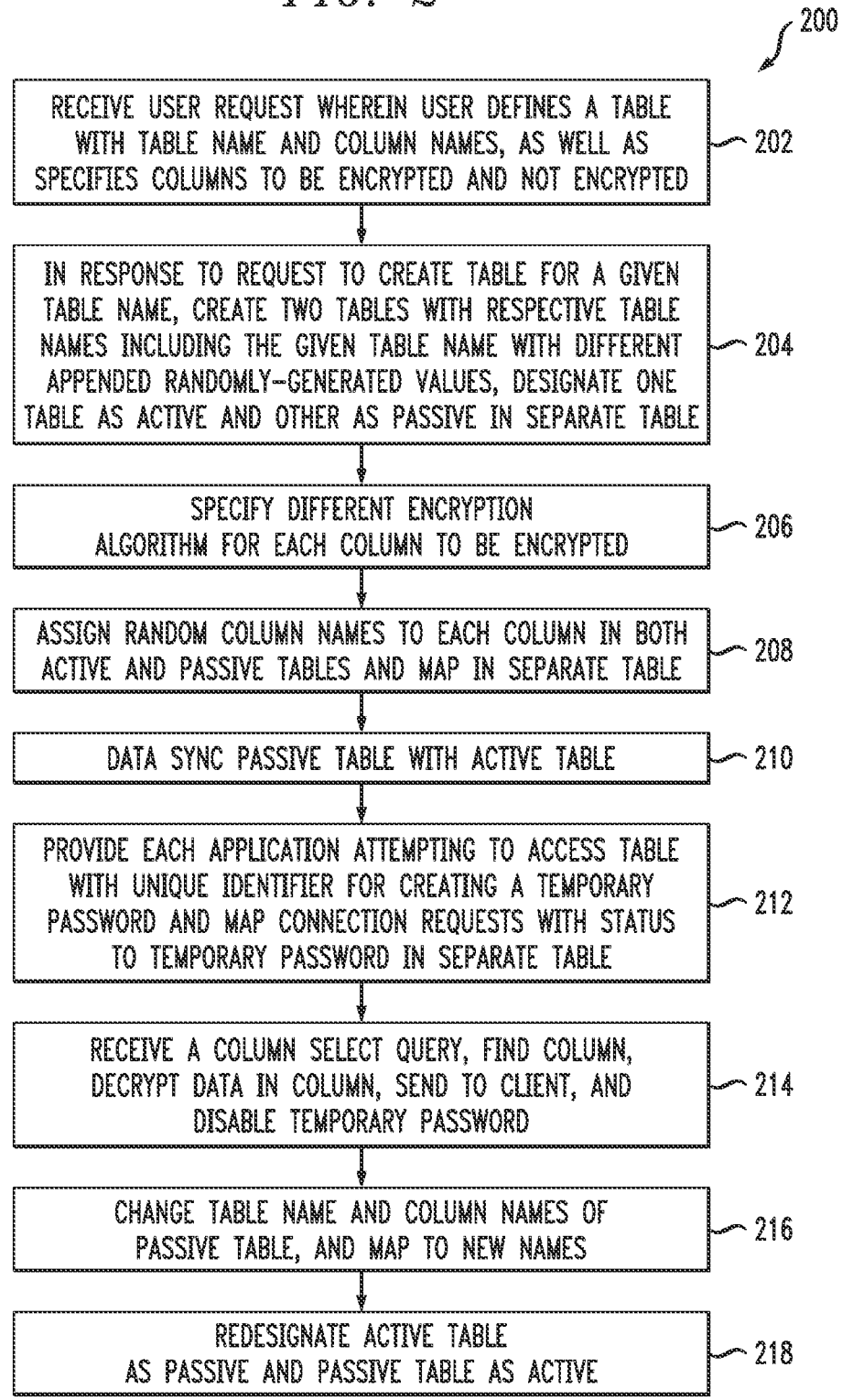

| CUSTOMER EMAIL |
| CUSTOMER ADDRESS |
| ZIP_CODE |
| PHONE_NUMBER |
| CUSTOMER IP |
| LICENSE KEY |
| CREDIT_CARD |

| ORIGINAL TABLE | DERIVED_TABLES | STATUS |
|---|---|---|
| CUSTOMER | CustomerS9rdfdc | ACTIVE |
| CUSTOMER | CustomerOfdfnk | PASSIVE |

|  | CustomerS9rdfdc | CustomerOfdfnk |
|---|---|---|
| CUSTOMER EMAIL | AA347F | GNA347F |
| CUSTOMER ADDRESS | VG89DF | ID89DF |
| ZIP_CODE | 68FGLC | 68FGLC |
| PHONE_NUMBER | 8MKS9 | DFFKS9 |
| CUSTOMER IP | MKV87D | IFV87D |
| LICENSE KEY | 9SKDB3 | DSKDB3 |
| CREDIT_CARD | 98DKF | D8DKS |

FIG. 3D
308

CustomerS9rdfdc

| CUSTOMER NUMBER | | AA347F | VG89DF | 68FGLC | 8MKS9 | MKV87D | 9SKDB3 | 98DKF |
|---|---|---|---|---|---|---|---|---|
| 11111 | abc@customer1.com | BANGALORE | 560047 | 919663305050 | 91.3.9.87.7 | 8DKFJ-SDKFO | 37873449367100 |
| 2222 | def@customer2.com | SEATTLE | 45637 | 1(510)876-889 | 178.89.78.67 | sdfm12knkdf== | 874593v87846678 |

FIG. 3E
310

CustomerOfdfnk

| CUSTOMER NUMBER | | GNA347F | ID89DF | 68FGLC | DFFKS9 | IFV87D | DSKDB3 | D8DKS |
|---|---|---|---|---|---|---|---|---|
| 11111 | abc@customer1.com | BANGALORE | 560047 | 919663305050 | 91.3.9.87.7 | 8DKFJ-SDKFO | 37873449367100 |
| 2222 | def@customer2.com | SEATTLE | 45637 | 1(510)876-889 | 178.89.78.67 | sdfm12knkdf== | 874593v87846678 |

FIG. 3F
312

| CONNECTION REQUEST | TEMPORARY UNIQUE PASSWORD FOR EACH REQUEST | STATUS |
|---|---|---|
| 123qw8dn19rn9j | 12234 | WAITING |
| 23s789jg8e7jekf | 43245 | COMPLETED |
| 88fn849kdn8nff | 78747 | WAITING |

400

SECURE DATA STRUCTURE FOR DATABASE SYSTEM

FIELD

The field relates generally to information processing systems, and more particularly to techniques for data protection in information processing systems.

BACKGROUND

Cyber-security is becoming more and more important with respect to protecting data in information processing systems as hackers are getting more and more sophisticated in their cyber-attacks. One main cause of data loss in a relational database-type information processing system is hackers obtaining the handle of a data structure such as a table when there is vulnerability in the code, e.g., as may be the case with structured query language (SQL) injections. For example, after a table data structure is defined in a database, and once a hacker knows the table name and column name (e.g., Cust_Credit_Card), it becomes only a matter of authentication hacking to read all sensitive data (e.g., customer credit card information) in the table data structure.

SUMMARY

Embodiments of the invention provide improved data protection techniques for data structures in an information processing system. While illustrative embodiments apply well to table data structures, it is to be understood that alternative embodiments can be applied to other data structures.

For example, in one illustrative embodiment, a method comprises the following steps. A request is received to create a data structure with a given data structure name and one or more given parameter names. A pair of data structures is generated in response to the request. Each of the pair of data structures is assigned a different randomly-generated data structure name derived from the given data structure name in the request, and the one or more given parameter names are assigned different one or more randomly-generated parameter names in each of the pair of data structures.

In additional illustrative embodiments, further security measures may comprise one or more of: (i) changing the randomly-generated data structure names and the randomly-generated parameter names in given intervals; (ii) when the one or more given parameter names comprises two given parameter names, encrypting data associated with each of the two given parameter names with a different encryption algorithm; (iii) designating one of the pair of data structures as active and the other of the pair of data structures as passive, applying a query received, for the data structure requested in the receiving step, to the data structure of the pair of data structures designated as active, data synchronizing the pair of data structures, and redesignating each of the pair of data structures; and (iv) using multiple factor authentication for client access. In illustrative embodiments, the data structure is a table, and the one or more parameters are one or more columns of the table.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other illustrative embodiments include, without limitation, apparatus, systems, methods and computer program products comprising processor-readable storage media.

BRIEF DESCRIPTION OF THE DRAWINGS

FIG. 1 illustrates an information processing system environment implementing secure tables and management thereof according to an illustrative embodiment.

FIG. 2 illustrates a methodology for managing secure tables according to an illustrative embodiment.

FIGS. 3A through 3F illustrate secure tables according to an illustrative embodiment.

DETAILED DESCRIPTION

Figure 4:
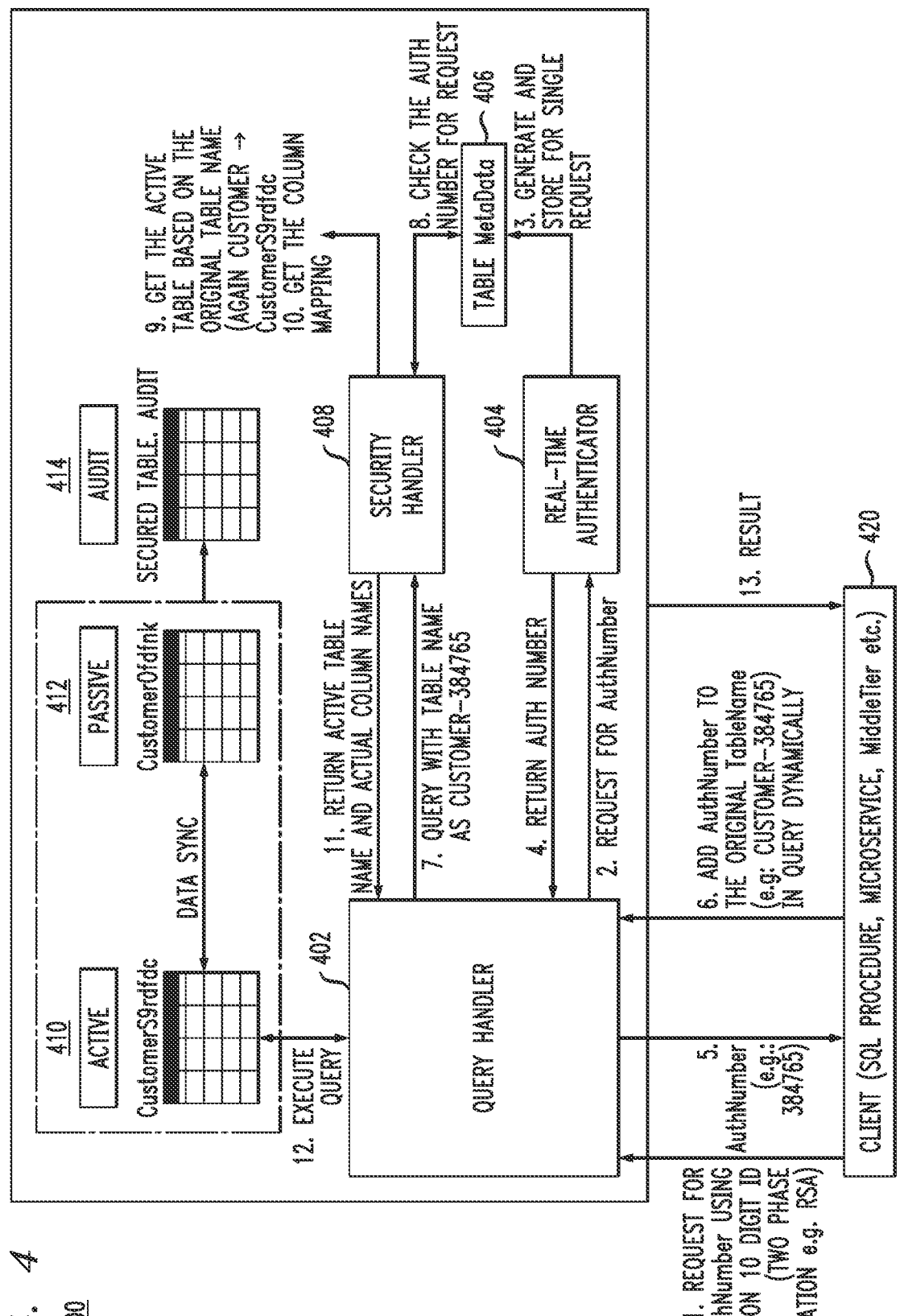
FIG. 4 illustrates an exemplary architecture of a secure table manager according to an illustrative embodiment.

Illustrative embodiments will be described herein with reference to exemplary information processing systems and associated computing and storage devices. It is to be appreciated, however, that embodiments are not necessarily restricted to use with the particular illustrative system and device configurations shown. Accordingly, the term "information processing system" as used herein is intended to be broadly construed, so as to encompass, for example, processing systems may comprise cloud computing and storage systems and/or non-cloud computing and storage systems, as well as other types of processing systems comprising various combinations of physical and virtual computing resources. Furthermore, some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or a computing system. On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services (e.g., database applications or services) on private clouds, public clouds, and/or a combination of private and public clouds (hybrid cloud computing environment). A computing environment that comprises multiple cloud platforms (private clouds, public clouds, or a combination thereof) is referred to as a "multi-cloud computing environment."

Moreover, phrases "computing environment," "cloud environment," "cloud computing platform," "cloud infrastructure," "data repository," "data center," "data processing system," "computing system," "data storage system," "information processing system," and the like as used herein are intended to be broadly construed, so as to encompass, for example, any arrangement of one or more processing devices.

While illustrative embodiments will be described herein in the context of relational database systems, it is to be appreciated that alternative embodiments may be applied in other types of information processing systems.

As mentioned above in the background section, data loss can occur in a relational database-type information processing system when a hacker obtains a relational database handle and learns a table name and/or one or more column names, e.g., due to vulnerability in the database code. Once a hacker knows this information, he can perform an authentication hack and read sensitive data in the table.

For example, existing tables in databases have fixed table names and column names. Moreover, the column name typically specifies the behavior or type of data inside that column, e.g., a column named CUST_CREDIT_CARD will normally have customer credit card data stored therein. Once the hacker obtains the table and column names, he can access the data using an SQL injection or directly query the table.

Illustrative embodiments overcome the above and other drawbacks with existing table data structure management by introducing the concept of a secure table. More particularly, in illustrative embodiments, sensitive data can be stored in a secure table data structure (secure table, for short) for which one or more security measures are implemented. In illustrative embodiments, the one or more security measures may comprise one or more of: (i) changing the table name in a given (e.g., relatively frequent) interval; (ii) changing the column name in a given (e.g., relatively frequent) interval; (iii) applying multiple factor authentication based on an application program that accesses the table data structure; (iv) encrypting one or more columns in the table data structure with a different encryption algorithm than one or more other columns in the table data structure; and (v) auditing user connections and failed connection attempts.

Furthermore, illustrative embodiments can keep the one or more security measures transparent to authorized clients (genuine database users) of the table data structure. That is, the authorized clients will use the table as it was defined by the creator and will be unaware of the one or more security measures that have been applied. However, with these one or more security measures applied, un-authorized clients (hackers) will find it extremely more difficult to access the data, even if they could hack the table name or column names, since what they obtain is not what is really there as database objects.

FIG. 1 illustrates an information processing system environment 100 implementing secure tables and management thereof according to an illustrative embodiment. As shown, a plurality of authorized clients 102-1, 102-2, ..., 102-N (collectively referred to as authorized clients 102 or individually referred to as authorized client 102) are configured to access a database system 110. Each authorized client 102 may have at least one application program (application) executing thereon that is configured to write data to, and read data from, database system 110. Also shown in information processing system environment 100 is an unauthorized client 104. Unauthorized client 104 is assumed to also be executing the same or a similar application as the authorized clients 102, or otherwise, some other application configured to write data to, and read data from, database system 110. Unauthorized client 104 is understood to be a hacker or malicious actor with intentions of accessing sensitive data in database system 110.

As further shown in FIG. 1, database system 110 comprises a set of secure tables 112 operatively coupled to a secure table manager 114. As will be explained in further detail below, secure table manager 114 is configured to, inter alia, perform and/or cause performance of the above-mentioned one or more security measures with respect to each of the secure tables 112, for example: (i) change the table name in a given (e.g., relatively frequent) interval; (ii) change the column name in a given (e.g., relatively frequent) interval; (iii) apply multiple factor authentication based on an application program that accesses the table; (iv) encrypt one or more columns in the table with a different encryption algorithm than one or more other columns in the table; and (v) audit client connections and failed connection attempts from authorized clients 102 as well as unauthorized client 104. Further details of the one or more security measures, as well as other functionalities of secure tables 112 and secure table manager 114, will be explained below in the context of FIGS. 2 through 4.

FIG. 2 illustrates a methodology 200 for managing secure tables according to an illustrative embodiment. Methodology 200 may be implemented in whole or in part by secure table manager 114 in some illustrative embodiments. In some alternative embodiments, one or more other components of a database system can be used to perform methodology 200. Note also that while illustrative embodiments refer to tables as the data structures being managed, other data structures can be managed in alternative embodiments, e.g., database files as well as other appropriate data structures.

In accordance with methodology 200, a secure table is constructed as follows.

In step 202, a user request is received to create a table data structure (table) specifying a table name, column names, and which columns are to be encrypted and which are not to be encrypted.

In step 204, in response to the request, two tables are created with table names appended with different values, e.g., 6 alpha-numeric values.

For example, assume in a user request, the user defines a table and assigns the table name "Customer". The user here is the entity defining the requested table. An example of this user-defined table is shown as 302 in FIG. 3A. Then, in response to this user request, the secure table manager 114 creates two tables, one named "CustomerS9rdfdc" and the other named "Customer0fdfnk" (note the two unique and randomly generated 6 alpha numeric values, S9rfdc and 0fdfnk, added to the original table name to create the two table names). Thus, the table names for the pair of tables are derived from the original table name in the user request. One of the two tables is designated as active, while the other one is designates as passive, such designation being recorded in a separate table by the secure table manager 114. Table 304 in FIG. 3B illustrates an example mapping of active/passive designation, i.e., the CustomerS9rdfdc table is active and the Customer0fdfnk is passive.

As illustratively used herein, an active designation for a table means that queries/requests to add, delete and/or modify data to the table originally defined by the user (e.g., "Customer") are applied to the active-designated table. In other words, for example, all data manipulation language (DML) based requests are applied to the active-designated table. As further illustratively used herein, a passive designation for a table means that the table does not get updated directly from the query/request as does the active table, but rather the passive table is updated by participating in a data synchronization (sync) operation with the active table in near real-time (i.e., contemporaneous with DML requests being applied to the active table). Since there will not be an active session in the passive table (Customer0fdfnk), the table name and column names can subsequently be changed and the client requests are shifted, as will be further explained.

Further, in the received request, assume the user defines the column names and primary column name as non-encrypted. For example, if the column names are customer_id, credit card, phone_number, then the user can define customer_id as a non-encrypted column for a parent-child relationship. Then, in step 206, for the columns that are to be encrypted, the secure table manager 114 specifies a different encryption algorithm for each column, and the column data is encrypted accordingly.

In step 208, for each table (two tables), unique and randomly-generated column names for each column are created and mapped to the original column names that the user defined (when requesting creation of the user-defined table in step 202). Thus, each table now has random column names rather than the original column names. Table 306 in FIG. 3C illustrates an example of a mapping of random column names for each table.

In step 210, both tables data sync in near real-time. Since both tables co-exist, there is no network latency in the data sync operation, and DML, operations apply to both. Active table CustomerS9rdfd is shown as 308 in FIG. 3D and passive table Customer0fdfnk is shown as 310 in FIG. 3E. Note that the data is synchronized between tables 308 and 310.

Now that the user-defined table is created in the database system as an active table and a passive table, applications executing on clients can attempt to access the user-defined table.

In step 212, each application that requests access to the table (connection request) is provided with a unique identifier, e.g., a 10-digit number, serving as a factor to provide multiple factor authentication, as will be further explained below. For example, the 10-digit identifier is used to create a temporary password (authentication number), which the application appends to the original table name. For example, if the temporary password is "f78hu9", the application issues "select credit_card from Customer-f78hu9 where customer_Id=2321". Table 312 in FIG. 3F illustrates an exemplary authentication table mapping connection requests and status with the temporary passwords. Generation and use of an authentication number will be further explained below in the context of FIG. 4.

In step 214, the request (column select query) goes to an interface of the secure table manager 114 which splits the query by the hyphen "-" and obtains the original table name and the temporary password. These steps will be further explained below in the context of FIG. 4. If the temporary password is valid, then the process continues. The interface of secure table manager 114 then gets the active table and gets the random column name of the active table. By way of example, assume an issued column select query is translated as "Select 98DKF from CustomerS9rdfd where customer_Id=2321". After selecting the appropriate column, assuming it is encrypted, the column is decrypted using mapped encryption logic and the query result is given back to the client. The temporary password is disabled (single use) such that, if the hacker (unauthorized client 104) could find this table name as Customer-f78hu9, he cannot access it since the password is disabled.

In step 216, secure table manager 114 then changes the table name and column names of the passive table, and maps to the new names. It is to be appreciated that changing of the table and column names (with new unique and randomly-generated values) can take place at frequent intervals. The frequency of the change is dependent on the security required/desired by the database system for a given application accessing the secure tables. Also, the intervals can be predetermined and/or random.

In step 218, secure table manager 114 redesignates the active table as passive, and the passive table as active. Now, a subsequent select query to the same column will go to passive table Customer0fdfnk as "Select D8DKS from Customer0fdfnk".

Advantageously, for example, methodology 200 enables the user to code the table name as Customer-f78hu9 (Original TableName-temporary_password), but the actual table name is CustomerS9rdfd, and the user defined column name is credit card but the actual column name is 98DKF.

Now, assume the hacker (unauthorized client 104 in FIG. 1) does the following:

1) Assume somehow the hacker found out the table name as "Customer" (from the user who created this table) but the hacker will find that table in that name does not exist.

2) Assume somehow the hacker found the issuing table name as "Customer-f78hu9". When he tries to get the data from that table, the hacker finds that table also does not exist.

3) Assume somehow the hacker has the handle to the interface, the password f78hu9 expires after the first request completes and therefore the hacker is thwarted.

4) Assume somehow the hacker found the column name that the user issues (credit_card), however, no column actually exists in that name.

5) Assume somehow the hacker found the actual active table CustomerS9rdfd. In a predetermined amount of time (e.g., eight hours) that table name changes to CustomerS9rdfd and column name also changes.

In summary, the hacker can never access the secure table directly or through vulnerable code. Even if he managed to hack one column's encryption logic, other columns are using different algorithms and he cannot access them.

FIG. 4 illustrates an exemplary architecture 400 of a secure table manager according to an illustrative embodiment. It is to be appreciated that architecture 400 is one example embodiment of an implementation of methodology 200 in secure table manager 114. Other architectures for secure table manager 114 and implementations of methodology 200 can be used in alternative embodiments.

As shown, secure table manager 400 is operatively coupled to a client 420. Secure table manager 400 comprises a query handler 402, a real-time authenticator 404, table metadata 406, a security handler 408, active table 410, passive table 412, and auditor 414. The numbers in the figure correspond to steps that will now be explained.

In step 1, the client 420 issues a query to secure table manager 400. In this illustrative embodiment, the query includes a request for an authentication number (AuthNumber) using the application 10-digit identifier (e.g., an application identifier) previously received from secure table manager 400, as described above. This provides two phase (factor) authentication along with an authentication number that will be explained below. One example of an authentication protocol that can be used is RSA-based authentication. The query goes to query handler 402.

In step 2, query handler 402 sends the request for an authentication number to real-time authenticator 404.

In step 3, real-time authenticator 404 generates the authentication number using the 10-digit identifier provided by client 420 and sends the authentication number to table metadata 406 for storage. Note that the authentication number is generated and stored for a single request for this particular client.

In step 4, real-time authenticator 404 returns the authentication number (e.g., 384765) to query handler 402.

In step 5, query handler 402 returns the authentication number to client 420.

In step 6, client 420 adds the authentication number to the user-defined table name. Recall in the example above that the original table name defined by the user is Customer. Thus, client 420 dynamically adds (appends) the authentication number to the original table name in the query and returns it to query handler 402, e.g., Customer-384765.

In step 7, query handler 402 sends the query with the table name and appended authentication number to security handler 408.

In step 8, security handler 408 checks the authentication number against the authentication number stored in table metadata 406 to verify a match.

In step 9, security handler 408 gets the table name of active table 410 based on the original table name in the request. This is determined via table 304 in FIG. 3B. Thus, for example, Customer is mapped to CustomerS9rdfdc which is designated as active.

In step 10, security handler 408 also gets the column name mappings for the active table 410 using, for example, table 306 in FIG. 3C.

In step 11, security handler 408 returns the active table name and actual column names to query handler 402.

In step 12, query handler 402 executes the query against active table 410.

In step 13, secure table manager 400 returns results of the query to client 420.

Note that, as explained above, active table 410 and passive table 412 perform a data sync such that the data in passive table 412 matches the data in active table 410 following the query, for example, as shown in tables 308 and 310 in FIGS. 3D and 3E respectively. Also note that the status of authentication numbers/temporary passwords are tracked by auditor 410 using, for example, table 312 in FIG. 3F (e.g., waiting or completed).

Advantageously, the secure table concept in database systems, as described herein, makes the table effectively transparent ("ghosts" the table) for hackers by changing table names and column names frequently. Further, access of the table comprises two phase authentication based on an application identifier, over and above database authentication, and accessing a secure table using an "Original Table Name—Temporary Password" format. Still further, illustrative embodiments encrypts (some or all) columns automatically with different encryption logic in each column. By way of summarizing advantages of some of the security measures described herein in an illustrative use case, consider the following:

1. A user creates secure table "Users" (Column: username, password).
2. In the backend (e.g., secure table manager) of the database system, two tables are created: Users-A (Columns usernameA, passwordA) and Users-B (Columns usernameB, passwordB). User-A is designated as active, and User-B is designated as passive.
3. When an application connects, it is asked to register and a 10-digit alpha numeric APPID (application identifier) is issued.
4. Assume the user wants to issue command "Select 1 from Users where username='shibi' and password='pratheek'.
5. Once the user is connected to the database, using a query string, the user applies for a temporary password with APPID, and assume the user gets 1234 as the temporary password.
6. The user then issues the command appending the temporary user name to the base table name. "Select 1 from Users1234 where username='shibi' and password='pratheek'.
7. The system checks the temporary password from a table name (Users), then determines what the actual active table name is. In this case, "Users-A".
8. The system now issues the command "Select 1 from Users-A where usernameA='shibi' and passwordA='pratheek'
9. Any authorized user connects to one table and the other table name will be changed. So here a first user connects to Users-A, and the table name of Users-B will be changed to Users-C.
10. After an interval Users-C will become active for the client connections, and Users-A will be changed to Users-D.
11. So the second time the authorized user accesses the database, the system generates the command as "Select 1 from Users-C where usernameC='shibi' and passwordC='pratheek'". This changing of names continues at predetermined intervals.
12. Thus, the underlying set of actual tables that correspond to a user-defined table are ghost tables, since they never keep permanent table names or column names, but rather keep changing.

Now consider an SQL attack. Normally, the attacker will find a weak query in the application, e.g., there is a product table (Normal Table not Secured), where the REST API has a query string such as: https://insecure-website.com/products?category='Gifts' and the underlying attack query may be: Select productname from Products where category='Gift'. It should be noted that the attacker is not really looking for the product table because he knows it contains only product details. Rather, the attacker is looking for the Users table described above. Therefore, the attacker will try to inject SQL to get all objects in the database by SQL injection. For example, he can try "Union" injection as https://insecure-website.com/products?category='Gifts' UNION select tablename from all_tables. Thus, the underlying query will be formed as: select productname from Products where category='Gift' UNION select tablename from all_tables.

Now, the hacker has the all_tables information along with the product name. He will get the ghost table names Products (Normal table), "Users-A and Users-B" (secure tables along with other tables). He will therefore be confused as to which table to attack, and he may select Users-A and use the same SQL injection to get a column name of that table. The attacker will get usernameA and passwordA. He will then issue the injection command: https://insecure-website.com/products?category='Gifts' UNION select tablename from all_tables. This SQL injection will be translated as: select productname from Products where category='Gift' UNION select usernameA, passwordA from usersA. This time, since the SQL injection is coming through the authorized APPID, it will get the temporary password as, e.g., 9876, and becomes: select productname from Products where category='Gift' UNION select usernameA, passwordA from usersA9876. This query will thus change in the query handler which expects this password to be appended as: BaseTable name+temporary password as Users9876. This will cause an error because the underlying table is users and not Users-A. In a further futile attempt, the attacker tries to get all the table names and columns. He will get Users-C and Users-D. But in vain, he cannot access those two tables because of the same reason explained above, i.e., the original table name is different. In practice, SQL injection occurs with a trail-error mechanism. However, with the secure table concept as described herein, this is nearly impossible due to frequent table_name and column_name rotation.

The particular processing operations and other system functionality described in conjunction with FIG. 1-4 are presented by way of illustrative example only, and should not be construed as limiting the scope of the disclosure in any way. Alternative embodiments can use other types of processing operations involving devices, systems and functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another within a given information processing system.

Processes and operations described herein can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system described herein may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components described herein can be implemented for use by tenants of such a multi-tenant environment.

As mentioned previously, cloud infrastructure as disclosed herein can include cloud-based systems. Virtual machines provided in such systems can be used to implement illustrative embodiments. These and other cloud-based systems in illustrative embodiments can include object stores.

Illustrative embodiments of processing platforms will now be described in greater detail with reference to FIGS. 5 and 6.

Figure 5:
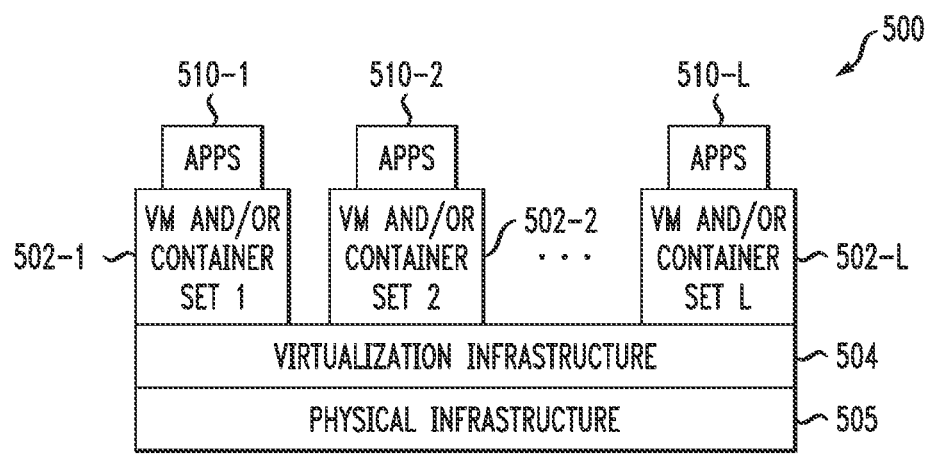
FIGS. 5 and 6 illustrate examples of processing platforms that may be utilized to implement at least a portion of an information processing system according to one or more illustrative embodiments.
Figure 6:
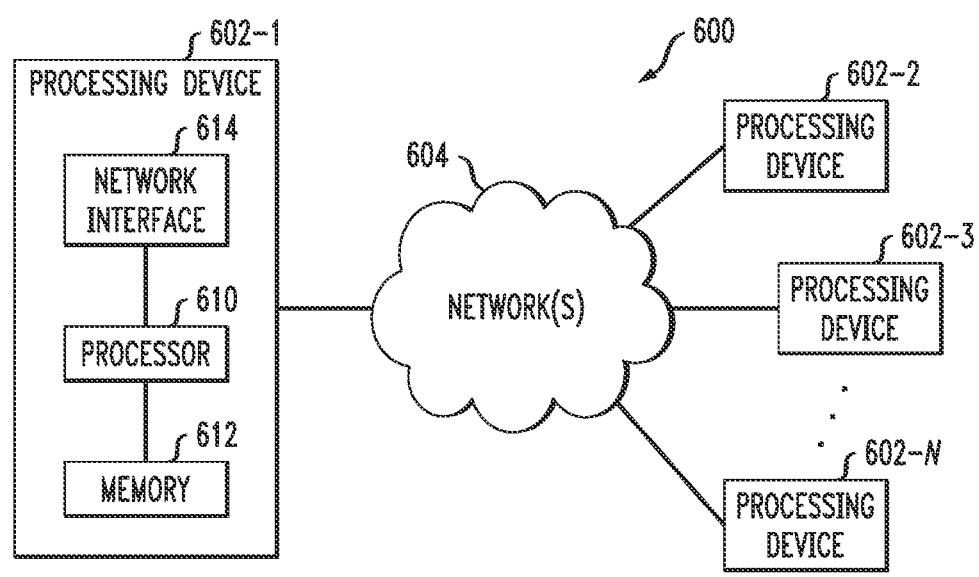

FIG. 5 shows an example processing platform comprising cloud infrastructure 500. The cloud infrastructure 500 comprises a combination of physical and virtual processing resources that may be utilized to implement at least a portion of the information processing systems described herein. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of information processing system environment 100 and includes a plurality of processing devices, denoted 602-1, 602-2, 602-3, . . . 602-N, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612. The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and information processing systems described herein may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of information processing systems as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory, the at least one processing device, when executing program code, is configured to:
    receive a request to create a data structure with a given data structure name and one or more given parameter names;
    generate a pair of data structures in response to the request, wherein each of the pair of data structures is assigned a different randomly-generated data structure name derived from the given data structure name in the request, and further wherein the one or more given parameter names are assigned different one or more randomly-generated parameter names in each of the pair of data structures;
    designate a first one of the pair of data structures as active and a second one of the pair of data structures as passive; and
    responsive to at least one authenticated access to the first data structure designated as active, redesignate the second data structure as active and the first data structure as passive and change at least one of the randomly-generated data structure name and one or more of the randomly-generated parameter names for the first data structure;
    wherein data manipulation language requests are directly applied to the one of the pair of data structures currently designated as active, and wherein the data manipulation language requests are indirectly applied to the other one of the pair of data structures currently designated as passive via a data synchronization operation with the one of the pair of data structure currently designated as active.

2. The apparatus of claim 1, wherein the processing device, when executing program code, is further configured to change the randomly-generated data structure names and the randomly-generated parameter names of the first data structure and the second data structure in given intervals.

3. The apparatus of claim 2 wherein the given intervals are predetermined.

4. The apparatus of claim 2 wherein the given intervals are random.

5. The apparatus of claim 1, wherein the processing device, when executing program code, is further configured to, when the one or more given parameter names comprises two given parameter names, encrypt data associated with each of the two given parameter names with a different encryption algorithm.

6. The apparatus of claim 1, wherein the processing device, when executing program code, is further configured to apply a query, received for the data structure requested in the receiving step, to the data structure of the pair of data structures currently designated as active.

7. The apparatus of claim 6, wherein the processing device, when executing program code, is further configured to data synchronize the data structure of the pair of data structures currently designated as passive with the data structure of the pair of data structures currently designated as active.

8. The apparatus of claim 1, wherein the processing device, when executing program code, is further configured to provide a client seeking to connect to the apparatus with an identifier.

9. The apparatus of claim 8, wherein the processing device, when executing program code, is further configured to:
obtain a request from the client, wherein the request comprises the identifier;
generate a temporary password for the request corresponding to the identifier; and
send the temporary password to the client.

10. The apparatus of claim 9, wherein the processing device, when executing program code, is further configured to receive a query from the client for the data structure requested in the receiving step, wherein the query comprises the data structure name appended with the temporary password.

11. The apparatus of claim 10, wherein the processing device, when executing program code, is further configured to:
verify the temporary password; and
apply the query to the data structure of the pair of data structures currently designated as active, in response to the temporary password being verified.

12. The apparatus of claim 1, wherein the data structure is a table, and wherein the one or more parameters are one or more columns of the table.

13. The apparatus of claim 1 wherein the second data structure is redesignated as active in response to a single authenticated access to the first data structure.

14. The apparatus of claim 1 wherein the second data structure is redesignated as active in response to a designated number of authenticated accesses to the first data structure, the designated number being greater than one.

15. A method comprising:
receiving a request to create a data structure with a given data structure name and one or more given parameter names;
generating a pair of data structures in response to the request, wherein each of the pair of data structures is assigned a different randomly-generated data structure name derived from the given data structure name in the request, and further wherein the one or more given parameter names are assigned different one or more randomly-generated parameter names in each of the pair of data structures;
designating a first one of the pair of data structures as active and a second one of the pair of data structures as passive; and
responsive to at least one authenticated access to the first data structure designated as active, redesignating the second data structure as active and the first data structure as passive and changing at least one of the randomly-generated data structure name and one or more of the randomly-generated parameter names for the first data structure;
wherein data manipulation language requests are directly applied to the one of the pair of data structures currently designated as active, and wherein the data manipulation language requests are indirectly applied to the other one of the pair of data structures currently designated as passive via a data synchronization operation with the one of the pair of data structure currently designated as active; and
wherein the steps are performed by at least one processing device comprising a processor coupled to a memory executing program code.

16. The method of claim 15, further comprising changing the randomly-generated data structure names and the randomly-generated parameter names of the first data structure and the second data structure in given intervals.

17. The method of claim 15, further comprising, when the one or more given parameter names comprises two given parameter names, encrypting data associated with each of the two given parameter names with a different encryption algorithm.

18. The method of claim 15, further comprising applying a query, received for the data structure requested in the receiving step, to the data structure of the pair of data structures currently designated as active.

19. An article of manufacture comprising a non-transitory processor-readable storage medium having stored therein program code of one or more software programs, wherein the program code when executed by a processing device causes said the processing device to:
receive a request to create a data structure with a given data structure name and one or more given parameter names;
generate a pair of data structures in response to the request, wherein each of the pair of data structures is assigned a different randomly-generated data structure name derived from the given data structure name in the request, and further wherein the one or more given parameter names are assigned different one or more randomly-generated parameter names in each of the pair of data structures; and
designate a first one of the pair of data structures as active and a second one of the pair of data structures as passive; and
responsive to at least one authenticated access to the first data structure designated as active, redesignate the second data structure as active and the first data structure as passive and change at least one of the randomly-generated data structure name and one or more of the randomly-generated parameter names for the first data structure;
wherein data manipulation language requests are directly applied to the one of the pair of data structures currently designated as active, and wherein the data manipulation language requests are indirectly applied to the other one of the pair of data structures currently designated as passive via a data synchronization operation with the one of the pair of data structure currently designated as active.

20. The article of claim 19, wherein the data structure is a table, and wherein the one or more parameters are one or more columns of the table.

* * * * *